(12) United States Patent
Huang et al.

(10) Patent No.: US 7,046,441 B2
(45) Date of Patent: May 16, 2006

(54) HIGH TRANSMITTANCE SUB-WAVELENGTH STRUCTURE POLARIZATION MODULE

(75) Inventors: Heng-Chun Huang, MiaoLi (TW);
Jauh-Jung Yang, Taipei (TW);
Jung-Yan Huang, Hsinchu (TW);
Ming-Yueh Liu, Taipei (TW);
Chuan-Kang Mu, TaiChung (TW)

(73) Assignee: Industrial Technology Research Institute, Hsinchu (TW)

( * ) Notice: Subject to any disclaimer, the term of this patent is extended or adjusted under 35 U.S.C. 154(b) by 42 days.

(21) Appl. No.: 10/812,970

(22) Filed: Mar. 31, 2004

(65) Prior Publication Data

US 2005/0141090 A1 Jun. 30, 2005

(30) Foreign Application Priority Data

Dec. 31, 2003 (TW) .............................. 92137857 A

(51) Int. Cl.
*G02B 27/28* (2006.01)
(52) U.S. Cl. ....................... 359/486; 359/569; 359/576
(58) Field of Classification Search ................ 359/486, 359/483, 485, 569, 619, 621, 623, 576
See application file for complete search history.

(56) References Cited

U.S. PATENT DOCUMENTS 5,581,405 A * 12/1996 Meyers et al. .............. 359/571

| | | | |
|---|---|---|---|
| 2002/0003661 A1* | 1/2002 | Nakai | 359/569 |
| 2003/0046839 A1* | 3/2003 | Oda et al. | 40/454 |
| 2003/0112523 A1* | 6/2003 | Daniell | 359/626 |
| 2004/0042081 A1* | 3/2004 | Kolste et al. | 359/569 |
| 2004/0165823 A1* | 8/2004 | Morris et al. | 385/33 |
| 2004/0247010 A1* | 12/2004 | Okada et al. | 372/102 |

OTHER PUBLICATIONS

Haidner et al., "Binary Subwavelength Structures/Resonance Gratings as Polariztion Elements", Apr. 3, 1998, IOP Publishing Ltd., Pure Applied Optics, No. 7, pp. 1347-1361.*

* cited by examiner

*Primary Examiner*—Drew A. Dunn
*Assistant Examiner*—Mark Consilvio
(74) *Attorney, Agent, or Firm*—Troxell Law Office, PLLC

(57) ABSTRACT

The present invention relates to a high-transmission polarization module composed of sub-wavelength structures, which comprises: a transmission substrate and a plurality of collimation units. The transmission substrate possesses a top and a bottom surfaces. The top surface has a plurality of projecting and sunken parts, wherein the sunken part has a first sub-wavelength structure while the projecting part has a second sub-wavelength structure. The collimation units are arranged on the bottom surface according to the positions of the sunken parts capable of guiding the light into the sunken part. The first sub-wavelength structure is capable of separating the light with different polarizations while the second sub-wavelength structure is capable of shifting the phase of the light so that the light can pass the polarization module with a high efficiency and producing a light with a specific polarization.

10 Claims, 6 Drawing Sheets

HIGH TRANSMITTANCE SUB-WAVELENGTH STRUCTURE POLARIZATION MODULE

FIELD OF THE INVENTION

The present invention relates to a high transmittance sub-wavelength structure polarization module, and more particularly, to a grating structure measured in nanometer with beam splitter and phase retardation capabilities for enhancing transmission efficiency.

BACKGROUND OF THE INVENTION

Polarized light are used in many optical systems, such as the optical pickup head of CD-ROMs, LCD, optical communications, optical lens, and sunglasses, etc. However, when a light consisted of two polarized lights passes through a conventional polarizer, the material or the multi-layer coating of the polarizer only allows one of the two polarized lights to pass through while the other polarized light will either be absorbed or reflected. Therefore, although the polarizer is capable of providing a polarized light with a specific polarization, more than 50% of the light will be lost. For better utilization of the light, the present invention provides a high transmittance sub-wavelength structure polarization module to improve the transmission efficiency.

SUMMARY OF THE INVENTION

The primary object of the present invention is to provide a high transmittance sub-wavelength structure polarization module capable of improving the transmission efficiency thereof.

To achieve the above-mentioned object, the high transmittance sub-wavelength structure polarization module comprises: a substrate having a top surface and a bottom surface, a plurality of collimation units, and a plurality of light sources, wherein, the top surface of the substrate has a plurality of projecting parts and a plurality of sunken parts, and a first-wavelength structure is disposed on the sunken part and a second-wavelength structure is disposed on the projecting part, and the collimation units are arranged on the bottom surface corresponding to the positions of the sunken parts, and the light sources are further arranged beneath the corresponding collimation units, so that the light coming from the light sources can be guided into the sunken parts.

To further describe the features, objects and functions of the present invention, drawings and detailed description of the preferred embodiment are presented as follows:

DESCRIPTION OF THE PREFERRED EMBODIMENT

Figure 1A:
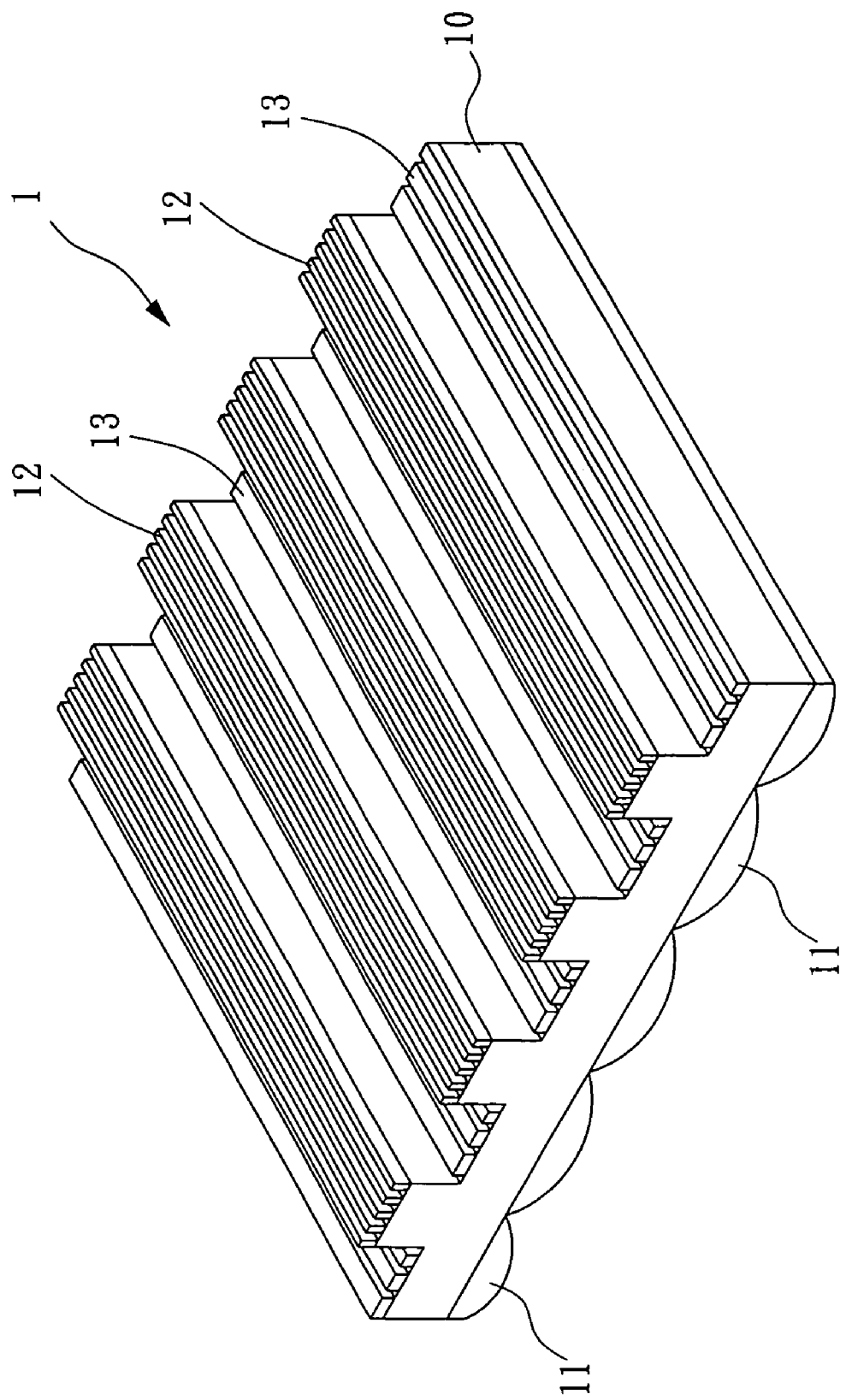
FIG. 1A is a 3-D schematic drawing of a high transmittance sub-wavelength structure polarization module depicting a first preferred embodiment of the present invention.
Figure 1B:
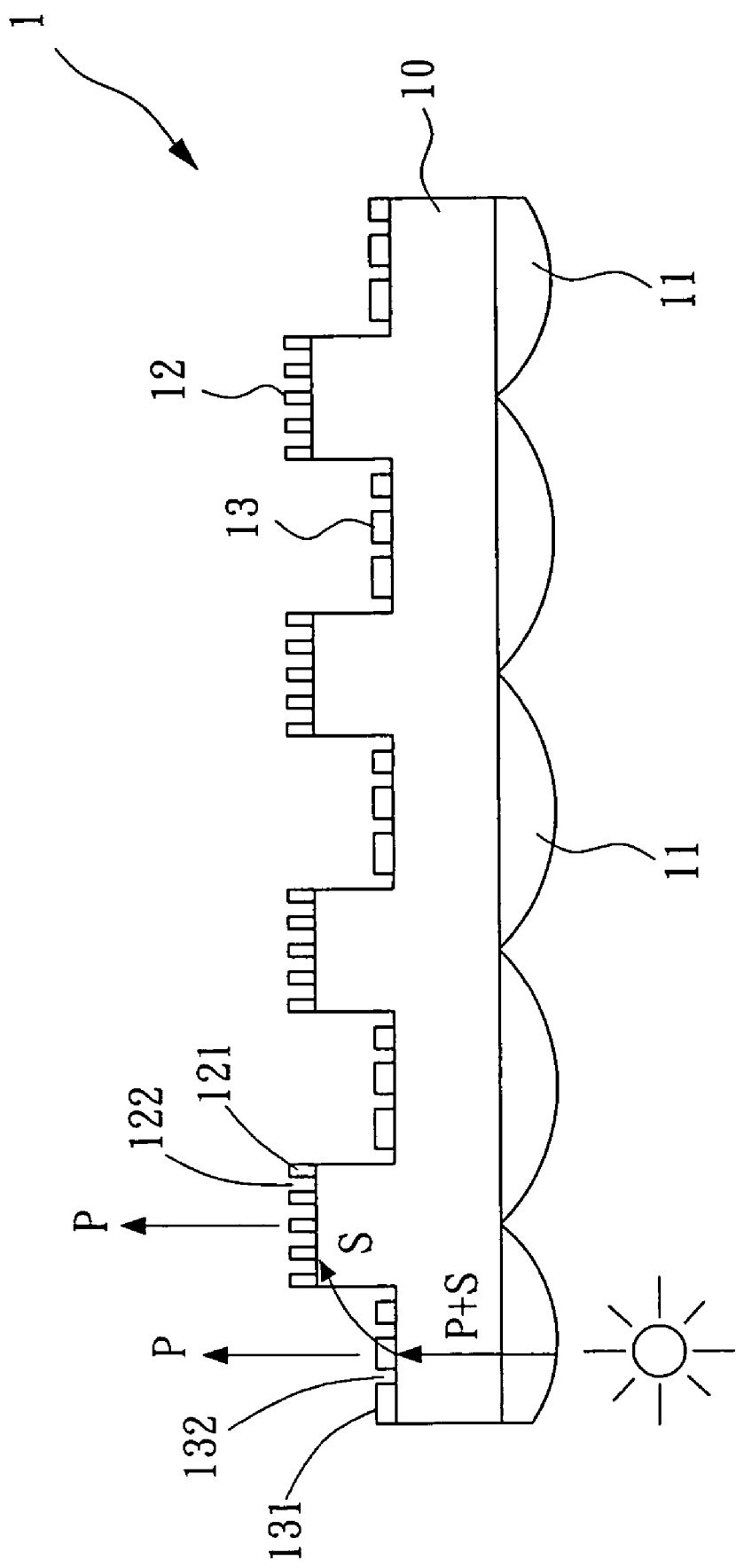
FIG. 1B is a side view drawing of a high transmittance sub-wavelength structure polarization module depicting a first preferred embodiment of the present invention.

Please refer to FIGS. 1A and 1B, which are a 3-D and a side-view drawings of a high transmittance sub-wavelength structure polarization module depicting a first preferred embodiment of the present invention, respectively. The polarization module 1 comprises: a transmission substrate 10, a plurality of collimation units 11, and a plurality of light sources. The transmission substrate 10 possesses a top and a bottom surfaces. The top surface has a plurality of projecting and sunken parts, wherein the sunken part has a first sub-wavelength structure 13 disposed thereon and the projecting part has a second sub-wavelength structure 12 disposed thereon. The collimation units 11 are arranged on the bottom surface corresponding to the positions of the sunken parts that the collimation units 11 are collimation lenses capable of guiding the light into the sunken parts. The light sources have at least two polarizations (i.e. a P-polarized and a S-polarized light), which are arranged beneath the collimation units 11 that the light emitting from the same can be guided to the sunken parts. The transmission substrate 10 possesses a top surface having a plurality of projecting and sunken parts and a bottom surface, wherein the projecting and the sunken parts are integrally formed of a same material while the projecting parts are slightly higher than the sunken parts. The transmission substrate 10 is made of a light-transmissible material (glass is used in the preferred embodiments of the present invention, but a light-transmissible plastic can be used as well. Other light-transmissible materials can also be adopted, while these variations are within the spirit and scope of the present invention and will not be discussed further.). A plurality of bar-type first grates 131, each having different width, are disposed on the sunken parts with a first trenches 132 separating every two first grates. The width of the first trench can be different. In addition, all the widths of the first grate 131 and the first trench 132 are smaller than the wavelength of the light emitted from the light source, and the first grate 131 can be made with $SiO_2$. The plural first grates 131 are arranged on the sunken part to compose a first sub-wavelength structure and together forming a first grating structure. In this regard, the beam will be diverted when it passes through the first sub-wavelength structure 13. By changing the size, shape, and separation of the first grates 131 of the first sub-wavelength structure 13, the first grating structure can have different affect on the light passing through the same. In the present preferred embodiment, the first sub-wavelength structure 13 is a beam splitter that the light with two polarizations emitted from the light source can be separated, such that the light with one polarization will pass through the first sub-wavelength structure 13 while the direction of the light with the other polarization will be diverted.

Moreover, the projecting parts have a plurality of bar-type second grates 121. The width of the second grate 121 is smaller than the wavelength of the light and the second grate 121 can be made of $SiO_2$. The second grate 121 is arranged on the sunken part to compose a second sub-wavelength structure 12 an together forming a second grating structure. In this regard, the beam will be diverted when it passes through the first sub-wavelength structure 12. By changing the size, shape, and separation of the second grate 121 of the second sub-wavelength structure, the second grating structure can have different affect on the light passing through the same. In the present preferred embodiment, the second sub-wavelength structure 12 is a polarization retardation element that the light will have a phase retardation while passing through the same, that is, a polarized light will be changed into a light of different polarization.

When operating the polarization module 1 according to the present embodiment, the light source emits light consisted of both P-polarized light and S-polarized light that is guided into the sunken part of the transmission substrate 10 by the collimation units 11 while the projecting part receives none. The plural first grates 131 of the first sub-wavelength structure 13 separates the P-polarized and S-polarized light as the light passes through the first sub-wavelength structure 13 in a way that the S-polarized light will be diverted to the projecting part while the P-polarized light will pass through the first sub-wavelength structure 13. Moreover, the diverted S-polarized light will be directed to the second sub-wavelength structure 12 after entering into the projecting part, and thus is converted into a P-polarized light since the second grates of the second sub-wavelength structure 12 enable the passing S-polarized light to have a phase retardation. Therefore, as the light from the light source (including both the P-polarized light and the S-polarized light) passes through the polarization module 1, the P-polarized light will pass through and the S-polarized light will be converted into the P-polarized light. Hence, a pure P-polarized light can be obtained at the top of the polarization module without losing any S-polarized light such that higher polarization efficiency can be achieved. Although the first grates of the first sub-wavelength structure 13 of the present preferred embodiment is designed for the P-polarized light to pass through while diverting the direction of the S-polarized light, it can be designed in the opposite way that the S-polarized light is allow to pass while diverting the direction of the P-polarized light. Moreover, the grating structure of the second sub-wavelength structure 12 can also be changed according to the first sub-wavelength structure 13 (so that the P-polarized light can be converted into the S-polarized light, or vice versa.)

Figure 2:
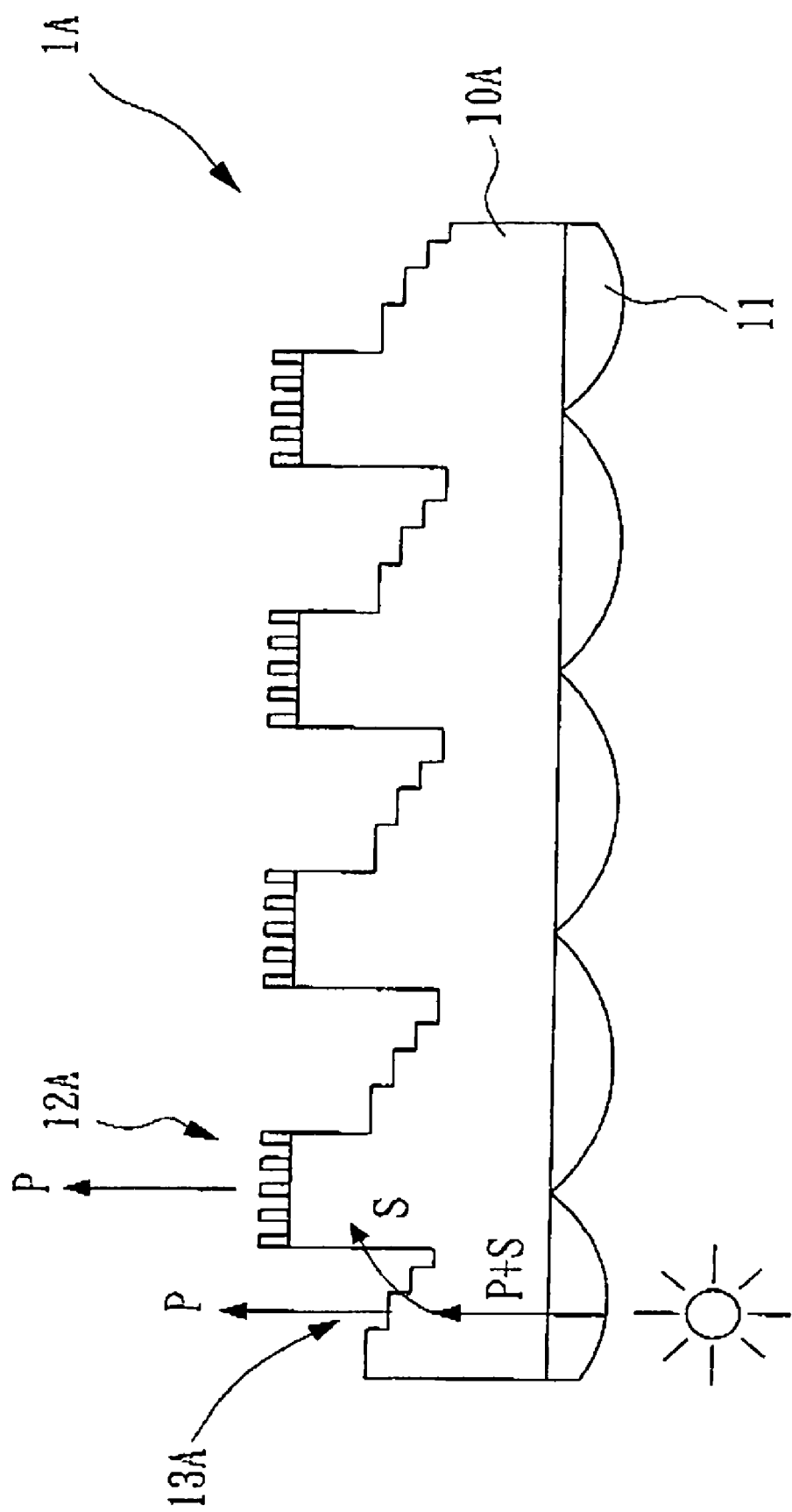
FIG. 2 is a side view drawing of a high transmittance sub-wavelength structure polarization module depicting a second preferred embodiment of the present invention.

Please refer to FIG. 2, which is a side view drawing of a high transmittance sub-wavelength structure polarization module depicting a second preferred embodiment of the present invention. The difference between the second embodiment and the first embodiment is that the first sub-wavelength structure 13A of FIG. 2 is a beam splitter with ladder structure and the second sub-wavelength structure 12A is a polarization retardation element. The light source emits light with both P and S-polarized light that is guided into the sunken part of the transmission substrate 10A by the collimation units 11 while the projecting part receives none. The first grates of the first sub-wavelength structure 13A separates the P-polarized and S-polarized light as the light passes through the first sub-wavelength structure 13A, and the S-polarized light will be diverted to the projecting part while the P-polarized light will pass through the first sub-wavelength structure 13A. Moreover, the diverted S-polarized light will be directed to the second sub-wavelength structure 12A after entering into the projecting part, and thus is converted into a P-polarized light since the second grates of the second sub-wavelength structure 12A enable the passing S-polarized light to have a phase retardation.

Figure 3:
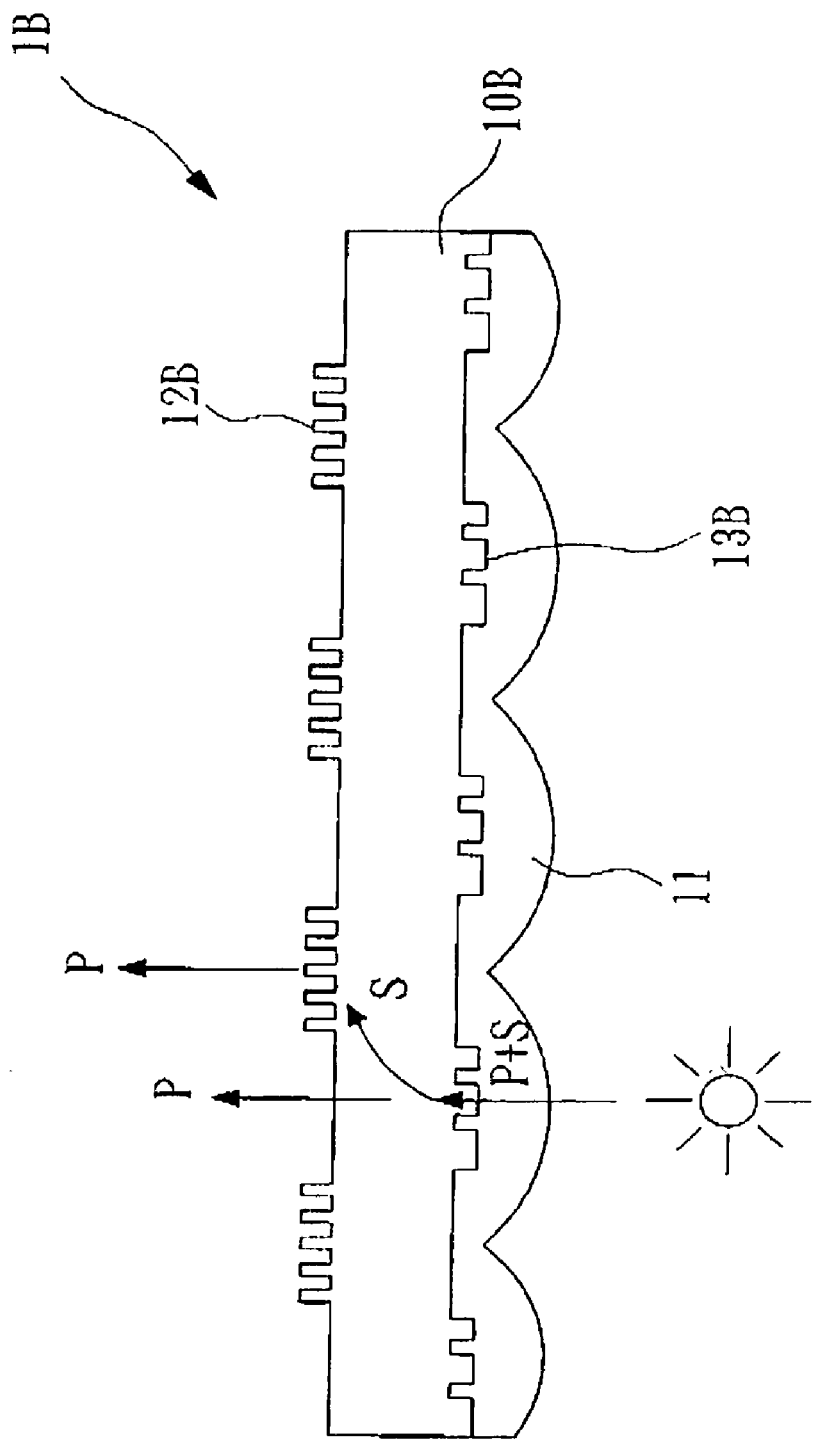
FIG. 3 is a side view drawing of a high transmittance sub-wavelength structure polarization module depicting a third preferred embodiment of the present invention.

Please refer to FIG. 3, which is a side view drawing of a high transmittance sub-wavelength structure polarization module depicting a third preferred embodiment of the present invention. The difference between the third embodiment and the first embodiment is as following: the first sub-wavelength structure 13B is arranged at the bottom surface of the transmission substrate 10B, and the second sub-wavelength structure 12B is arranged at the top surface of the transmission substrate 10B, in addition, the collimation units 11 are arranged beneath the first sub-wavelength structure 13B. The light source emits light with both P and S-polarized light that is guided to the first sub-wavelength structure 13B disposed at the bottom surface of the substrate 10B by the collimation units. The first grates of the first sub-wavelength structure 13B separates the P-polarized and S-polarized light as the light passes through the first sub-wavelength structure 13B, and the S-polarized light will be diverted to the second sub-wavelength structure 12B while the P-polarized light will pass through the first sub-wavelength structure 13B. Moreover, the diverted S-polarized light will be directed to the second sub-wavelength structure 12 after entering into the projecting part, and thus is converted into a P-polarized light since the second grates of the second sub-wavelength structure 12 enable the passing S-polarized light to have a phase retardation.

Figure 4A:
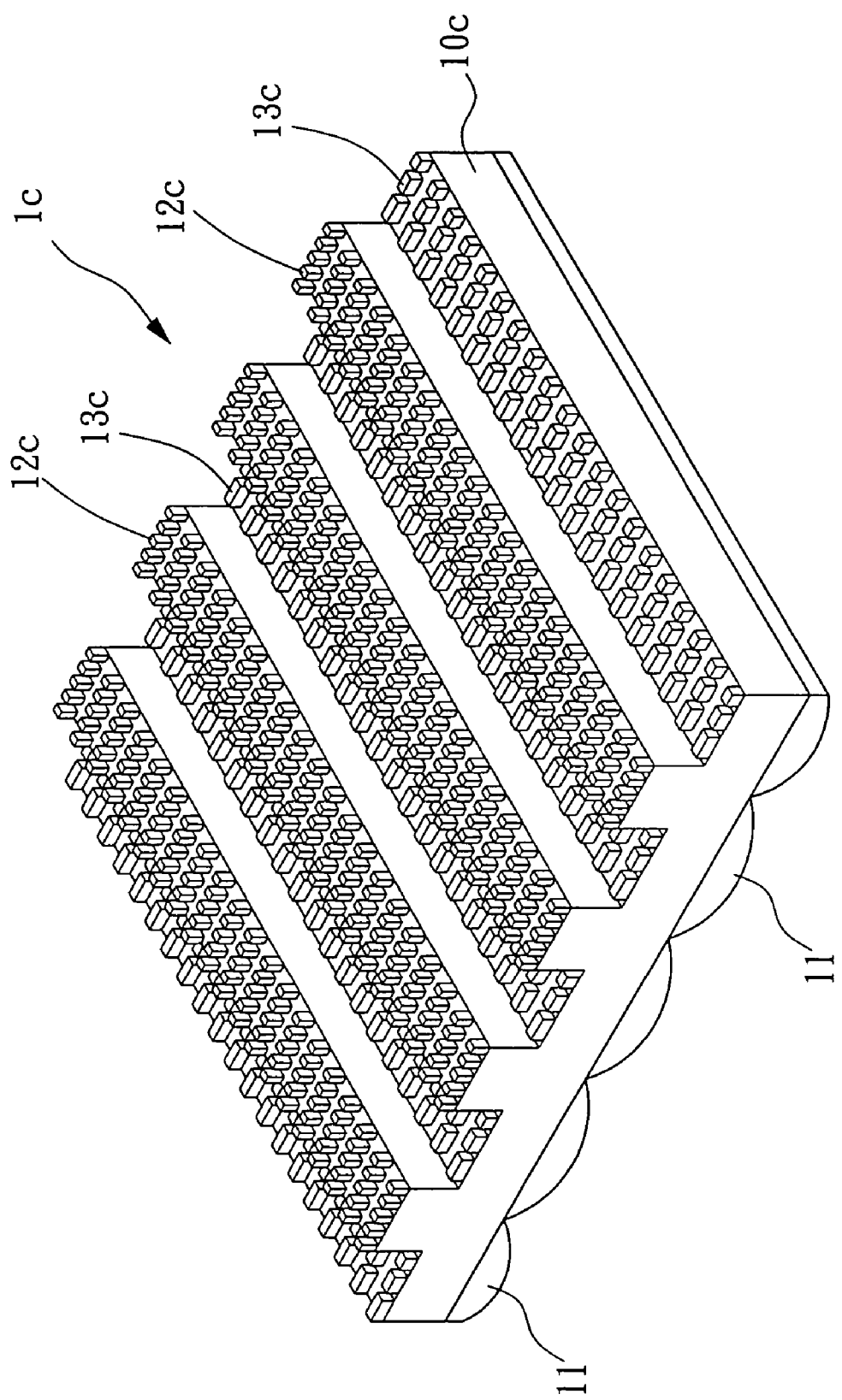
FIG. 4A is a 3-D schematic drawing of a high transmittance sub-wavelength structure polarization module depicting a fourth preferred embodiment of the present invention.
Figure 4B:
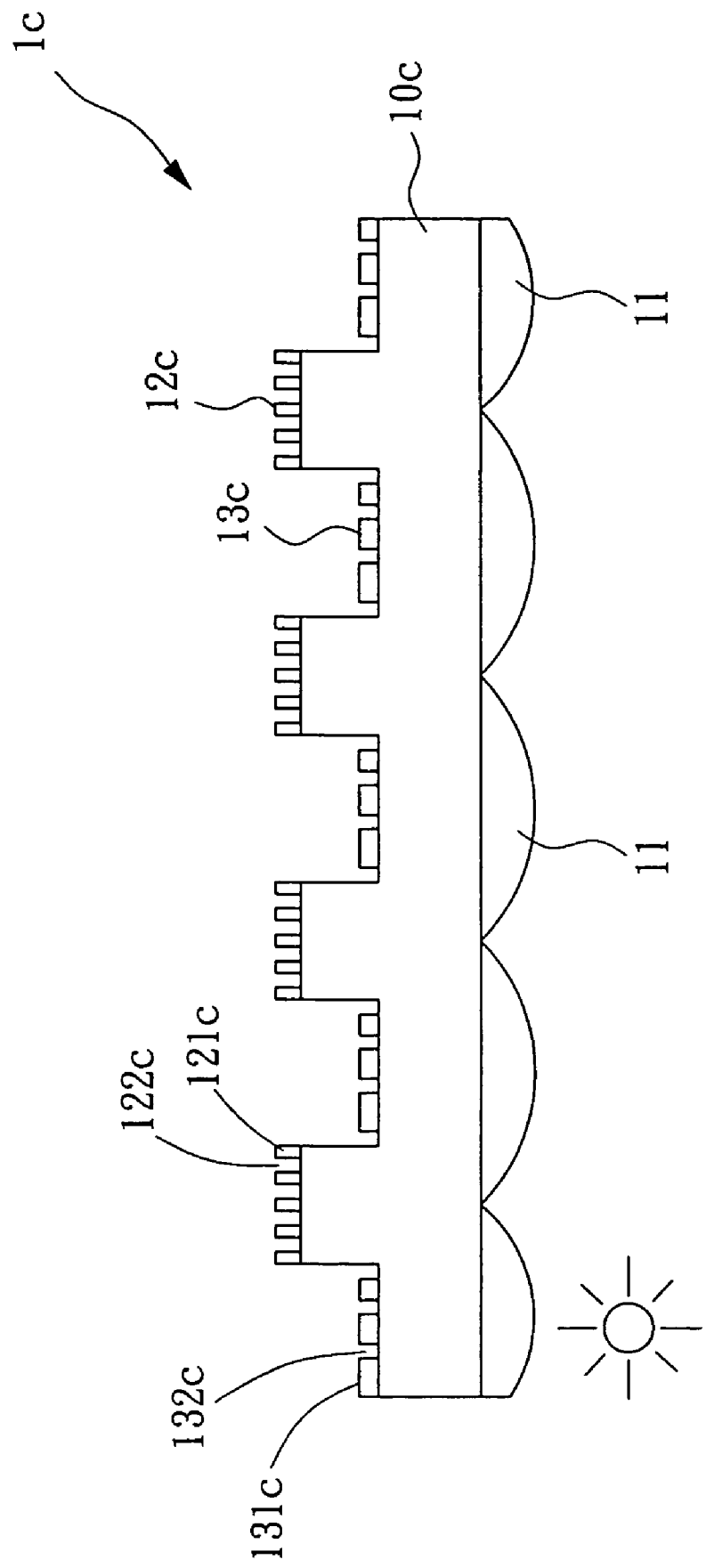
FIG. 4B is a side view drawing of a high transmittance sub-wavelength structure polarization module depicting a fourth preferred embodiment of the present invention.

Please refer to FIGS. 4A and 4B, which are a 3-D and a side-view drawings of a high transmittance sub-wavelength structure polarization module depicting a fourth preferred embodiment of the present invention, respectively. The difference between the fourth and the first embodiments is as following: both the first grate 131C and the second grate 121C are not bar-type grates, but are 2-D grating structures formed by a plurality of blocks, such that the grating structure with function of the beam splitter and that of the polarization retardation element can be acquired by changing the size, shape, and separation of the block. In the fourth preferred embodiment, the first sub-wavelength structure 13C is a beam splitter and the second sub-wavelength structure 12C is a polarization retardation element. The light source emits light with both P and S-polarized light that is guided into the sunken part of the transmission substrate 10C by the collimation units 11C while the projecting part receives none. The first grate of the first sub-wavelength structure 13C separates the P-polarized and S-polarized light as the light passes through the first sub-wavelength structure 13C, and the S-polarized light will be diverted to the projecting part while the P-polarized light will pass through the first sub-wavelength structure 13C. Moreover, the diverted S-polarized light will be directed to the second sub-wavelength structure 12C after entering into the projecting part, and thus is converted into a P-polarized light since the second grates of the second sub-wavelength structure 12C enable the passing S-polarized light to have a phase retardation. However, since the sizes of the first and the second-grates of the high-transmission sub-wavelength structure polarization module are both smaller than the wavelength of the light emitted from the light source, these optical elements are called sub-wavelength optical elements (SOE) that the nanometer-scale fabrication technology is required for making the same. Therefore, to fabricate the high-transmission sub-wavelength structure polarization module of the present invention, first is to produce a mask with the negative of the desired nanometer pattern utilizing the nanoimprint lithography, then the mask is used to print the wafer covered with the protection layer (i.e. a photoresist), finally, after separating the mask, the photoresist is removed by reactive ion etching to transfer the nanometer pattern onto the transmission substrate, in addition, a post-printed process is then used to improve the quality by adding metal layers. The process uses direct physical process to produce nanometer pattern without using any energy beam, so that the effects of diffraction, scattering, and interference due to the small size of the grate are eliminated. Moreover, the mask can be reused to profit in mass production, and the high-transmission sub-wavelength structure polarization module of the present invention can be modulized by utilizing the nanoimprint lithography without manual assembly capable of being used in many optical devices (ex. LCD).

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A high transmittance sub-wavelength structure polarization module, comprising:
    a transmission substrate, having a top surface and a bottom surface, said top surface being composed of a plurality of projecting parts and a plurality of sunken parts, wherein said sunken part has a first sub-wavelength structure disposed thereon and said projecting part has a second sub-wavelength structure disposed thereon; and
    a plurality of collimation units, being disposed at the bottom surface of said transmission substrate corresponding to said projecting and sunken parts of said top surface;
    wherein each collimation unit of the plurality of collimation units is capable of collimating a light into a position of said corresponding sunken part,
    wherein a light source is arranged beneath each collimation unit of the plurality of collimation units for providing said light, and said light composed of a first-polarized light and a second polarized light.

2. The polarization module of claim 1, wherein said first sub-wavelength structure is one of the following: a ladder structure consisted of a plurality of first grates of different widths and height and a grating structure consisted of a plurality of first grates of different widths, capable of separating said first and second-polarized light and diverting the direction of said second-polarized light so as to allow said first-polarized light to pass through the same and divert said second-polarized light to said projecting parts of said top surface.

3. The polarization module of claim 2, wherein the measures of said first grate are smaller than the wavelength of said light.

4. The polarization module of claim 3, wherein said second sub-wavelength structure is composed of a plurality of second grate of the same width forming a polarization retardation element capable of delaying the phase of said light by 90 degree.

5. The polarization module of claim 4, wherein the measures of said second grate are smaller than the wavelength of said light.

6. The polarization module of claim 1, wherein said transmission substrate is made of a transparent polymer material.

7. The polarization module of claim 5, wherein said substrate can be made of a material different from that of the first grate and the second grate.

8. The polarization module of claim 4, wherein said first and second grate are lump grates.

9. A high transmittance sub-wavelength structure polarization module, comprising:
    a transmission substrate, having a top surface and a bottom surface, wherein said top surface has a dual-tier sub-wavelength structure that a lower tier of the dual-tier sub-wavelength structure has a first sub-wavelength structure and an upper tier of the dual-tier sub-wavelength structure has a second sub-wavelength structure;
    wherein said bottom surface has a plurality of collimation units, arranged corresponding to a top surface of said dual-tier structure, capable of collimating a light into a corresponding position of said lower layer,
    wherein a light source is arranged beneath each collimation unit of the plurality of collimation units for Providing said light, and said light composed of a first-polarized light and a second polarized light.

10. The polarization module of claim 9, wherein the positioning of said first sub-wavelength structure and said second sub-wavelength is one of the following: independently lined-up oneself corresponding to the other and interlaced with each other.

* * * * *